Patented Oct. 16, 1928.

1,688,169

UNITED STATES PATENT OFFICE.

AUGUST WINGLER, OF ELBERFELD, NEAR COLOGNE-ON-THE-RHINE, GERMANY, ASSIGNOR TO WINTHROP CHEMICAL COMPANY, INC., OF NEW YORK, N. Y.

ISOBUTYL ESTER OF THE DI-IODIDE OF BEHENOLIC ACID AND PROCESS OF PREPARING SAME.

No Drawing. Application filed May 11, 1926, Serial No. 108,413, and in Germany May 12, 1925.

My invention relates to the hitherto unknown ester of di-iodide of behenolic acid with isobutyl alcohol. The new compound has most probably the following formula:—

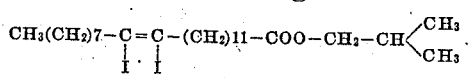

It is a useful product in medicine. It is specially suitable for subcutaneous use in view of its oily form and absence of irritation.

The process for producing the new compound consists in esterifying the di-iodide of behenolic acid or by treating with iodin or iodin furnishing substances the ester of isobutyl alcohol with behenolic acid or by treating other esters of the di-iodide of behenolic acid with isobutyl alcohol.

In order to illustrate my invention more fully the following example is given, the parts being by weight:—

One part of the di-iodide of behenolic acid is heated to 100° C. during several hours together with 3 parts of isobutyl alcohol containing 4 per cent of concentrated sulfuric acid. The reaction mass is shaken for several times with water to remove the excess of alcohol. Subsequently the ester is dissolved in ether, the ether is dried with $Na_2SO_4$ and driven off. The resulting ester recrystallizes from alcohol at 0° C.—It is a limped oil solidifying at 14° C. and containing 39.2 per cent of iodin.

I claim:—

1. The process of producing the isobutyl ester of the di-iodide of behenolic acid, which process consists in substituting the hydrogen of the carboxylic group of the di-iodide of behenolic acid by the isobutyl radicle.

2. The new isobutyl ester of the di-iodide behenolic acid having most probably the formula:—

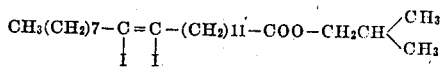

which is a limpid oil solidifying at 14° C. containing 39.2 per cent of iodin and being a useful iodin preparation in medicine.

In testimony whereof I have hereunto set my hand.

AUGUST WINGLER.